United States Patent
Bajaj et al.

(10) Patent No.: US 11,972,886 B2
(45) Date of Patent: Apr. 30, 2024

(54) MAGNETIC NANOPARTICLES EMBEDDED IN POLYMER MICROPARTICLES

(71) Applicant: SHPP Global Technologies B.V., Bergen op Zoom (NL)

(72) Inventors: Devendra Bajaj, Mt. Vernon, IN (US); Viswanathan Kalyanaraman, Mt. Vernon, IN (US)

(73) Assignee: SHPP Global Technologies B.V., Bergen op Zoom (NL)

( * ) Notice: Subject to any disclaimer, the term of this patent is extended or adjusted under 35 U.S.C. 154(b) by 729 days.

(21) Appl. No.: 17/048,195

(22) PCT Filed: Apr. 17, 2019

(86) PCT No.: PCT/US2019/027904
§ 371 (c)(1),
(2) Date: Oct. 16, 2020

(87) PCT Pub. No.: WO2019/204468
PCT Pub. Date: Oct. 24, 2019

(65) Prior Publication Data
US 2021/0104343 A1    Apr. 8, 2021

Related U.S. Application Data

(60) Provisional application No. 62/659,441, filed on Apr. 18, 2018.

(51) Int. Cl.
*H01F 1/34*    (2006.01)
*C08J 3/21*    (2006.01)
*C08K 3/22*    (2006.01)

(52) U.S. Cl.
CPC ............ *H01F 1/344* (2013.01); *C08J 3/212* (2013.01); *C08K 3/22* (2013.01);
(Continued)

(58) Field of Classification Search
CPC ............ H01F 1/00; H01F 1/344; C08J 3/212
See application file for complete search history.

(56) References Cited

U.S. PATENT DOCUMENTS

| | | | |
|---|---|---|---|
| 4,774,265 | A | 9/1988 | Ugelstad et al. |
| 6,210,625 | B1 | 4/2001 | Matsushita et al. |

(Continued)

FOREIGN PATENT DOCUMENTS

| | | | |
|---|---|---|---|
| CN | 104538168 | * | 12/2014 |
| CN | 105513741 | * | 1/2016 |

(Continued)

OTHER PUBLICATIONS

Ren. Magnetic Janus Particles and Their Applications. A Dissertation Submitted to the Graduate Faculty in Chemistry in Partial . Published Feb. 2014. Retrieved from https://academicworks.cuny.edu/cgi/viewcontent.cgi?article=1098&context=gc_etds on Jul. 15, 2023. p. 1-146. (Year: 2014).*

(Continued)

*Primary Examiner* — Matthew E. Hoban
(74) *Attorney, Agent, or Firm* — Quicker Law, LLC

(57) ABSTRACT

Various aspects disclosed relate to hybrid nanoparticles embedded in non-magnetic microparticles. These materials can be used to directionally orient and impart an ordered structure to a variety of materials.

20 Claims, 7 Drawing Sheets

Polymer Microparticle + Iron Oxide Nanoparticles = Iron Oxide coated polymer Microparticle Polymer Microparticle + Iron Oxide Nanoparticles = Completely embedded Iron Oxide-polymer Microparticle Polymer Microparticle + Iron Oxide Nanoparticles = Embedded Iron Oxide-polymer Microparticle (52) U.S. Cl.
CPC .......... *C08K 2003/2272* (2013.01); *C08K 2201/005* (2013.01); *C08K 2201/01* (2013.01); *C08K 2201/011* (2013.01)

(56) References Cited

U.S. PATENT DOCUMENTS

| | | | |
|---|---|---|---|
| 8,101,680 B1 * | 1/2012 | Ramakrishan | C08K 3/22 |
| | | | 524/439 |
| 8,779,046 B2 | 7/2014 | Nam et al. | |
| 9,181,395 B2 | 11/2015 | Kalayaraman et al. | |
| 9,384,877 B2 | 7/2016 | Weller et al. | |
| 2008/0152909 A1 | 6/2008 | Kyotani et al. | |
| 2011/0212032 A1 | 9/2011 | Chung et al. | |
| 2011/0217544 A1 | 9/2011 | Young et al. | |
| 2012/0052286 A1 | 3/2012 | Norwood et al. | |
| 2012/0141380 A1 | 6/2012 | Margel et al. | |
| 2015/0302948 A1 | 10/2015 | Hong et al. | |
| 2017/0114191 A1 | 4/2017 | Chen et al. | |

FOREIGN PATENT DOCUMENTS

| | | |
|---|---|---|
| CN | 107849257 A | 3/2018 |
| JP | H09-067467 A | 3/1997 |
| KR | 10-0705742 B1 | 4/2007 |
| WO | WO 2008/075011 A1 | 6/2008 |
| WO | WO 2015/147931 A1 | 10/2015 |
| WO | WO 2016/134224 A1 | 8/2016 |
| WO | WO 2017/019899 A1 | 2/2017 |

OTHER PUBLICATIONS

Filipcsei et al.; "Magnetic Field-Responsive Smart Polymer Composites"; Oligomers Polymers Composites Molecular Imprinting; 2007; p. 137-189 (abstract only).

Pan et al.; "Additive Manufacturing of Magnetic Field-Responsive Smart Polymer Composites"; ASME 11$^{th}$ Int'l Manufacturing Science and Engineering Conf.; 2016; (abstract only).

Nunes et al.; "Multifunctional Shape and Size Specific Magneto-Polymer Composite Particles"; Nano Letters; vol. 10; 2010; p. 1113-1119.

Vert et al.; "Terminology for biorelated polymers and applications (IUPAC Recommendations 2012)"; Pure Appl. Chem.; vol. 84; 2012; p. 377-410.

"Horiba Scientific—A Guidebook to Particle Size Analysis"; Horiba Instruments Inc.; © 2012; 34 pages.

Lassenberger et al.; "Monodisperse Iron Oxide Nanoparticles by Thermal Decomposition: Elucidating Particle Formation by Second-Resolved in Situ Small-Angle X-ray Scattering" Chemistry of Materials; vol. 29; 2017; p. 4511-4522.

International Patent Application No. PCT/US2019/027904; Int'l Search Report and the Written Opinion; dated Jul. 30, 2019; 13 pages.

International Patent Application No. PCT/US2019/027904; Int'l Preliminary Report on Patentability; dated Oct. 29, 2020; 9 pages.

Barthelat et al.; "On the mechanics of mother-of-pearl: A key feature in the material hierarchical structure"; Journal of Mechanics and Physics of Solids; vol. 55; 2007; p. 306-337.

Naleway et al.; "Structural Design Elements in Biological Materials: Application to Bioinspiration"; Advanced Materials; vol. 27; 2015; p. 5455-5476.

Le Ferrand et al.; "Magnetically assisted slip casting of bioinspired heterogeneous composites"; Nature Materials; vol. 14; 2015; p. 1172-1179 and Supporting Online Material; 48 total pages.

Wegst et al.; "Bioinspired structural materials"; Nature Materials; vol. 14; Jan. 2015; p. 23-36.

Martin et al.; "Designing bioinspired composite reinforcement architectures via 3D magnetic printing"; Nature Communications; vol. 6; 2015; 8641; 7 pages.

Deville et al.; "Freezing as a Path to Build Complex Composites"; Science; vol. 311; Jan. 2006; p. 515-518.

Deville et al.; "Ice-templated porous alumina structures"; Acta Materialia; vol. 55; 2007; p. 1965-1974.

Clegg et al.; "A simple way to make tough ceramics"; Nature; vol. 347; Oct. 1990; p. 455-457.

Wegst et al.; "Bioinspired structural materials"; Nature Materials; 2014; 14 pages.

Harun et al.; "A miniemulsion polymerization technique for encapsulation of silicon quantum dots in polymer nanoparticles"; Nanoscale; vol. 11; 2011; p. 4733-4741 (abstract only).

Yu et al.; "Preparation and characterization of titanium dioxide core/polymer shell hybrid composite particles prepared by emulsion polymerization"; Journal of Applied Polymer; vol. 92; 2004; p. 2970-2975 (abstract only).

Jian et al.; "A novel process to prepare magnetic polymer microspheres"; Chemistry Letters; vol. 36; 2007; p. 1062-1063 (abstract only).

Fischer, V. et al. "Luminescent and Magnetoresponsive Multifunctional Chalcogenide/Polymer Hybrid Nanoparticles", The Journal of Physical Chemistry, vol. 117, 2013, pp. 5999-6005.

Fischer, V. et al. "Metal Oxide/Polymer Hybrid Nanoparticles with Versatile Functionality Prepared by Controlled Surface Crystallization", Advanced Functional Materials, vol. 23, 2013, pp. 451-466.

Bannwarth, M. "Smart Magnetic Dispersions—From Switchable Release to Well-Defined Hybrid Nanofibers", Dissertation, Johannes Gutenberg-Universitat Mainz, 2013, 205 pgs.

* cited by examiner

A non-magnetic building block material (platelet shape) coated with a magnetic polymeric particle. Small spheres are magnetic nanoparticles, and large spheres are polymeric microparticles (Type I).

A non-magnetic building block material (platelet shape) coated with a magnetic polymeric particle. Small spheres are magnetic nanoparticles, and large spheres are polymeric microparticles (Type II).

2 μm*  EHT = 20.00 kv  Signal A = SE1
       WD = 11.0 mm   Mag = 2.00 K X

MAGNETIC NANOPARTICLES EMBEDDED IN POLYMER MICROPARTICLES

CROSS-REFERENCE TO RELATED APPLICATION

This application is the National Stage of International Application No. PCT/US2019/027904 filed Apr. 17, 2019, which claims the benefit of U.S. Provisional Application No. 62/659,441 filed Apr. 18, 2018, the disclosures of which are incorporated herein by this reference in their entireties.

FIELD OF THE DISCLOSURE

The present disclosure relates to hybrid nanoparticles, and more particularly to hybrid nanoparticles embedded in non-magnetic microparticles that can be used to directionally orient and impart an ordered structure to a variety of materials.

BACKGROUND

Injection molded plastic parts can be made from filled resins, in which the filler can have a high aspect ratio (length/diameter), such as short or long glass fiber, short or long carbon fiber, carbon nanotubes, etc. or a low aspect ratio, such as spherical particles of $TiO_2$, ZnO, color pigments etc. The orientation of the high aspect ratio fillers is primarily dependent on the mold design and the flow fields in the mold cavity. Consequently, parts made from filled resins exhibit anisotropic mechanical properties, e.g., the mechanical properties change as a function of direction of loading due to filler orientation, making the part strong in one orientation and weak in another. In comparison, compression molding of filled resins results in the random orientation of fillers and therefore offers less control over the anisotropy and final mechanical properties of the part. Some other concerns in plastic parts made from filled resins include poor dispersion and distribution of fillers that also results in anisotropic material properties.

SUMMARY OF THE DISCLOSURE

Composites such as continuous carbon fiber composites have highly structured fiber orientations that help control the anisotropy, and can be used to create strong, stiff, and tough parts. However, highly structured composites are difficult to manufacture. Therefore, there is a need for user-friendly methods to manufacture filled plastic parts and composites.

The present disclosure addresses this need by providing a way to control the orientation of one or more components in a blend of two or more components to arrive at a novel way to tailor mechanical and physical properties of a composite material. The disclosure provides, among other things, a simple way to combine organic and inorganic materials into composites using polymer particles and nanoparticles that respond to a magnetic field. The resulting microparticles can be directionally oriented using a magnetic field to construct a composite via, for example, compression molding.

In various aspects, a magnetic particle having a plurality of inorganic or organic nanoparticles embedded in at least one microparticle of a polymeric material is provided.

In various aspects, a method of making particle having a plurality of inorganic or organic nanoparticles embedded in at least one microparticle of a polymeric material is provided. The nanoparticles can be magnetic inorganic nanoparticles or magnetic organic nanoparticles. The method includes contacting an aqueous composition, including at least one surfactant, with a solution of the at least one polymeric material dissolved in an organic solvent; emulsifying the aqueous composition and the solution to form a dispersion of organic droplets including at least one polymeric material and the nanoparticles. In the method, the nanoparticles are dispersed in the aqueous composition or in the organic solvent.

In various aspects, a particle that can respond to a magnetic field has from about 0.01% to about 25% w/w (weight/weight %) of iron oxide nanoparticles embedded in a polyetherimide microparticle, in which each of the iron oxide nanoparticles has an average size of from about 10 nanometer (nm) to about 5000 nm, is provided.

Unexpectedly, when small amounts of magnetically responsive nanoparticles are partially or wholly embedded in a polymeric microparticle, the resulting composite material can be directed or oriented by a magnetic field. Such particles can be attached or bonded to other materials, such as ceramics, and further oriented in a magnetic field to construct structures that have tailored mechanical and physical properties as a result of the magnetically controlled orientation and morphology of its building blocks.

BRIEF DESCRIPTION OF THE FIGURES

The drawings illustrate generally, by way of example, but not by way of limitation, various aspects of the present disclosure.

DETAILED DESCRIPTION OF THE DISCLOSURE

Reference will now be made in detail to certain aspects of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In various aspects, a particle having a plurality of inorganic or organic nanoparticles embedded in at least one microparticle is provided. The plurality of inorganic or organic nanoparticles can be a plurality of magnetic inorganic nanoparticles or a plurality of magnetic organic nanoparticles, or a combination thereof. The microparticle can be a polymeric material or a mixture of polymeric materials. The particle, therefore, is a hybrid material that includes a plurality of magnetic nanoparticles in a single microparticle. The nanoparticles can have an average size, as measured by the largest dimension of the nanoparticle, ranging from about 10 nm to about 5000 nm, about 20 nm to about 4000 nm, about 30 nm to about 3000 nm, about 40 nm to about 2000 nm, about 50 nm to about 1000 nm, about 60 nm to about 500 nm, about 70 nm to about 400 nm, about 80 nm to about 300 nm, about 90 nm to about 200 nm, or any range or sub-range between these values. The nanoparticles can have an average size of about 10 nm, 30 nm, 50 nm, 70 nm, 90 nm, 110 nm, 130 nm, 150 nm, 170 nm, 190 nm, 210 nm, 230 nm, 250 nm, 270 nm, 290 nm, 310 nm, 330 nm, 350 nm, 370 nm, 390 nm, 410 nm, 430 nm, 450 nm, 470 nm, 490 nm, 510 nm, 530 nm, 550 nm, 570 nm, 590 nm, 610 nm, 630 nm, 650 nm, 670 nm, 690 nm, 710 nm, 730 nm, 750 nm, 770 nm, 790 nm, 810 nm, 830 nm, 850 nm, 870 nm, 890 nm, 910 nm, 930 nm, 950 nm, 970 nm, 990 nm, or 1000 nm.

Figure 1:
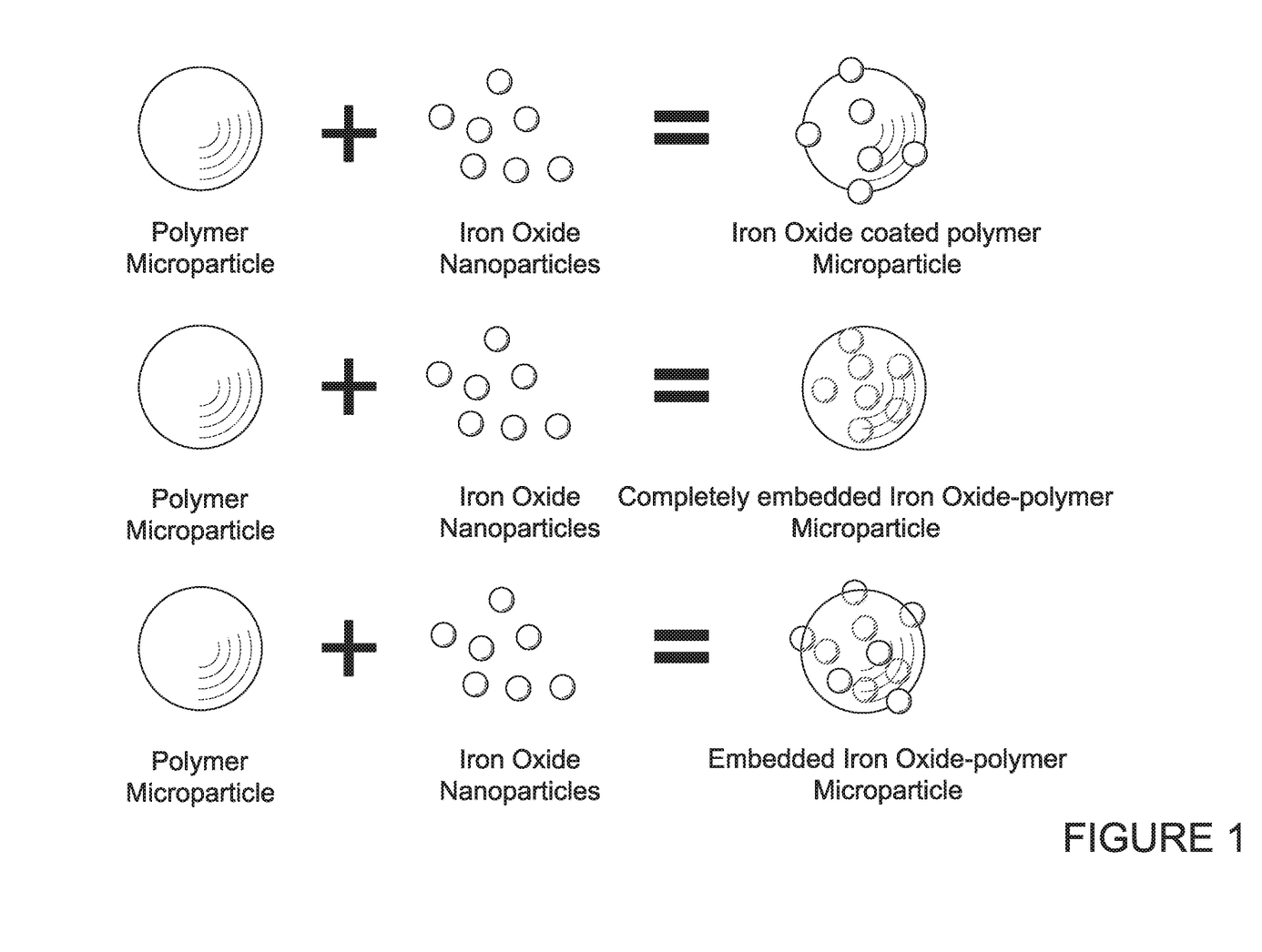
FIG. 1 is a cartoon representation of iron oxide embedded nanoparticles in a polymeric microparticle, according to various aspects.

In various aspects, the nanoparticles can have an average size of about 1010 nm, 1030 nm, 1050 nm, 1070 nm, 1090 nm, 1110 nm, 1130 nm, 1150 nm, 1170 nm, 1190 nm, 1210 nm, 1230 nm, 1250 nm, 1270 nm, 1290 nm, 1310 nm, 1330 nm, 1350 nm, 1370 nm, 1390 nm, 1410 nm, 1430 nm, 1450 nm, 1470 nm, 1490 nm, 1510 nm, 1530 nm, 1550 nm, 1570 nm, 1590 nm, 1610 nm, 1630 nm, 1650 nm, 1670 nm, 1690 nm, 1710 nm, 1730 nm, 1750 nm, 1770 nm, 1790 nm, 1810 nm, 1830 nm, 1850 nm, 1870 nm, 1890 nm, 1910 nm, 1930 nm, 1950 nm, 1970 nm, 1990 nm, 2010 nm, 2030 nm, 2050 nm, 2070 nm, 2090 nm, 2110 nm, 2130 nm, 2150 nm, 2170 nm, 2190 nm, 2210 nm, 2230 nm, 2250 nm, 2270 nm, 2290 nm, 2310 nm, 2330 nm, 2350 nm, 2370 nm, 2390 nm, 2410 nm, 2430 nm, 2450 nm, 2470 nm, 2490 nm, 2510 nm, 2530 nm, 2550 nm, 2570 nm, 2590 nm, 2610 nm, 2630 nm, 2650 nm, 2670 nm, 2690 nm, 2710 nm, 2730 nm, 2750 nm, 2770 nm, 2790 nm, 2810 nm, 2830 nm, 2850 nm, 2870 nm, 2890 nm, 2910 nm, 2930 nm, 2950 nm, 2970 nm, 2990 nm, 3010 nm, 3030 nm, 3050 nm, 3070 nm, 3090 nm, 3110 nm, 3130 nm, 3150 nm, 3170 nm, 3190 nm, 3210 nm, 3230 nm, 3250 nm, 3270 nm, 3290 nm, 3310 nm, 3330 nm, 3350 nm, 3370 nm, 3390 nm, 3410 nm, 3430 nm, 3450 nm, 3470 nm, 3490 nm, 3510 nm, 3530 nm, 3550 nm, 3570 nm, 3590 nm, 3610 nm, 3630 nm, 3650 nm, 3670 nm, 3690 nm, 3710 nm, 3730 nm, 3750 nm, 3770 nm, 3790 nm, 3810 nm, 3830 nm, 3850 nm, 3870 nm, 3890 nm, 3910 nm, 3930 nm, 3950 nm, 3970 nm, 3990 nm, 4010 nm, 4030 nm, 4050 nm, 4070 nm, 4090 nm, 4110 nm, 4130 nm, 4150 nm, 4170 nm, 4190 nm, 4210 nm, 4230 nm, 4250 nm, 4270 nm, 4290 nm, 4310 nm, 4330 nm, 4350 nm, 4370 nm, 4390 nm, 4410 nm, 4430 nm, 4450 nm, 4470 nm, 4490 nm, 4510 nm, 4530 nm, 4550 nm, 4570 nm, 4590 nm, 4610 nm, 4630 nm, 4650 nm, 4670 nm, 4690 nm, 4710 nm, 4730 nm, 4750 nm, 4770 nm, 4790 nm, 4810 nm, 4830 nm, 4850 nm, 4870 nm, 4890 nm, 4910 nm, 4930 nm, 4950 nm, 4970 nm, 4990 nm, or any range or sub-range between these values. FIG. 1 shows a cartoon of nanoparticles embedded on the surface of a polymer microparticle (top), completely embedded in the interior of the polymer microparticle (middle), and partially embedded on the surface and in the interior of the microparticle (bottom).

In various aspects, the average size of the microparticle, as measured by the largest dimension of the microparticle, is from about 0.25 micron (μm) to about 75 μm, about 0.5 μm to about 65 μm, about 1 μm to about 55 μm, about 2 μm to about 45 μm, about 3 μm to about 35 μm, about 4 μm to about 25 μm, about 5 μm to about 15 μm, or any range or sub-range between these values. In various aspects, the microparticles have an average size of about 0.5 μm, bout 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, about 40 μm, about 41 μm, about 42 μm, about 43 μm, about 44 μm, about 45 μm, about 46 μm, about 47 μm, about 48 μm, about 49 μm, about 50 μm, about 51 μm, about 52 μm, about 53 μm, about 54 μm, about 55 μm, about 56 μm, about 57 μm, about 58 μm, about 59 μm, about 60 μm, about 61 μm, about 62 μm, about 63 μm, about 64 μm, about 65 μm, about 66 μm, about 67 μm, about 68 μm, about 69 μm, about 70 μm, about 71 μm, about 72 μm, about 73 μm, about 74 μm, about 75 μm, or any range or sub-range between these values.

Nanoparticle and microparticle sizes can be determined by methods such as scanning electron microscopy, atomic force microscopy, dynamic light scattering, or laser diffraction. The nanoparticles or microparticles can be monodisperse. Nanoparticles can have $d_{90}$ values of about 1 μm, about 2 μm, about 3 μm, about 4 μm, about 5 μm, about 6 μm, about 7 μm, about 8 μm, about 9 μm, about 10 μm, or any range or sub-range in between these values. In various aspects, nanoparticles can have $d_{90}$ values of about 5 μm. Microparticles can have $d_{90}$ values of about 70 μm, about 71 μm, about 72 μm, about 73 μm, about 74 μm, about 75 μm, about 76 μm, about 77 μm, about 78 μm, about 79 μm, about 80 μm, or any range or sub-range between these values. In various aspects, microparticles can have $d_{90}$ values of 75 μm.

In various aspects the nanoparticles can be nanoparticles comprising a magnetic material, such as a metal oxide. Suitable metal oxides include, but are not limited to, $Al_2O_3$, NiO, $Fe_2O_3$, $Fe_3O_4$, $ZrO_2$, $MoO_3$, $CeO_2$, $Y_2O_3$, $TiO_2$, MgO, ZnO, $ZrO_2$, SnO or combinations thereof. The nanoparticles can be substantially a single metal oxide or a mixture of metal oxides.

In various aspects, the nanoparticles respond to a magnetic field. The nanoparticles can respond to a magnetic field to an extent that allows for a material that contains embedded nanoparticles to also move in the magnetic field, thereby also moving the entire particle in which the nanoparticles are embedded in. A magnetic field suitable to cause movement of the nanoparticles embedded in microparticles can have a field strength of about 0.01 T to about 3 T. When nanoparticles are embedded in the microparticles described herein, the combined particles (nanoparticles embedded in microparticles) can move or flow when the magnetic field is moved. In various aspects, the amount of nanoparticles in the microparticle can be from about 0.01% to about 25% w/w, about 0.025% to about 20% w/w, about 0.075% to about 15% w/w, about 1% to about 10% w/w, about 2% to about 8% w/w, about 3% to about 7% w/w, about 4% to about 6% w/w relative to the weight of the microparticle, or any range or sub-range between these values. In various aspects, the amount of nanoparticles in the microparticle can be about 0.01% w/w, about 0.025% w/w, about 0.05% w/w, about 0.1% w/w, about 0.25% w/w, about 0.5% w/w, about 0.75% w/w, about 1% w/w, about 1.5% w/w, about 2% w/w, about 2.5% w/w, about 3% w/w, about 3.5% w/w, about 4% w/w, about 4.5% w/w, about 5% w/w, about 6% w/w, about 7% w/w, about 8% w/w, about 9% w/w, about 10% w/w, about 11% w/w, about 12% w/w, about 13% w/w, about 14% w/w, about 15% w/w, about 16% w/w, about 17% w/w, about 18% w/w, about 19% w/w, about 20% w/w, about 21% w/w, about 22% w/w, about 23% w/w, about 24% w/w, about 25% w/w relative to the weight of the microparticle, or any range or sub-range between these values.

In various aspects the microparticle can include a thermoplastic resin. The microparticle can contain a single thermoplastic resin or a mixture of thermoplastic resins. Suitable thermoplastic resins include, but are not limited to, polyetherimide, polycarbonate, polyether ether ketone, polyethersulfone, monopolymers and co-polymers of any of the forgoing, or combinations thereof. In various aspects, the microparticle is a cured thermoplastic resin.

In various aspects, the nanoparticles are homogenously distributed throughout the microparticle. When nanoparticles are homogenously distributed throughout the microparticle, they are present in a substantially uniform distribution in the interior of the microparticle, a uniform distribution on the surface of the microparticle, or in a uniform distribution both on the surface and in the interior of the microparticle. The nanoparticles can also, in some instances, be non-homogenously distributed throughout the microparticle. For example, in some instances, there can be a gradient distribution of nanoparticles in the microparticles, such that the concentration of nanoparticles in the microparticles is greater in one region of the microparticles than in another different region. In some instances, the nanoparticles can be primarily concentrated in one region of the microparticles, whereas other regions of the microparticles contain little or no nanoparticles. The nanoparticles can also be both encapsulated and embedded in the microparticle such that there are microparticles both on the surface and in the interior of the microparticle according to any of the homogenous or non-homogenous distributions described herein.

In various aspects, the nanoparticles are substantially embedded in the microparticle. In various aspects, the nanoparticles are at least partially disposed on the surface of the microparticle. When nanoparticles are partially disposed on the surface of the microparticle, a portion of the nanoparticle can also be in the interior of the microparticle.

When nanoparticles are embedded on the surface of a microparticle, they can be disposed over any suitable portion of the surface area of the microparticle. For example, in various aspects, the nanoparticles can be disposed on from about 0.1% to about 50%, about 1% to about 40%, about 2% to about 30%, about 3% to about 20%, about 4% to about 15%, about 5% to about 10% of the surface area of the microparticle, or any range or sub-range between these values. In various aspects, the nanoparticle can be disposed on about 0.1%, about 1%, about 2%, about 3%, about 4%, about 5%, about 6%, about 7%, about 8%, about 9%, about 10% of the surface area of the microparticle, or any range or sub-range between these values.

Figure 2:
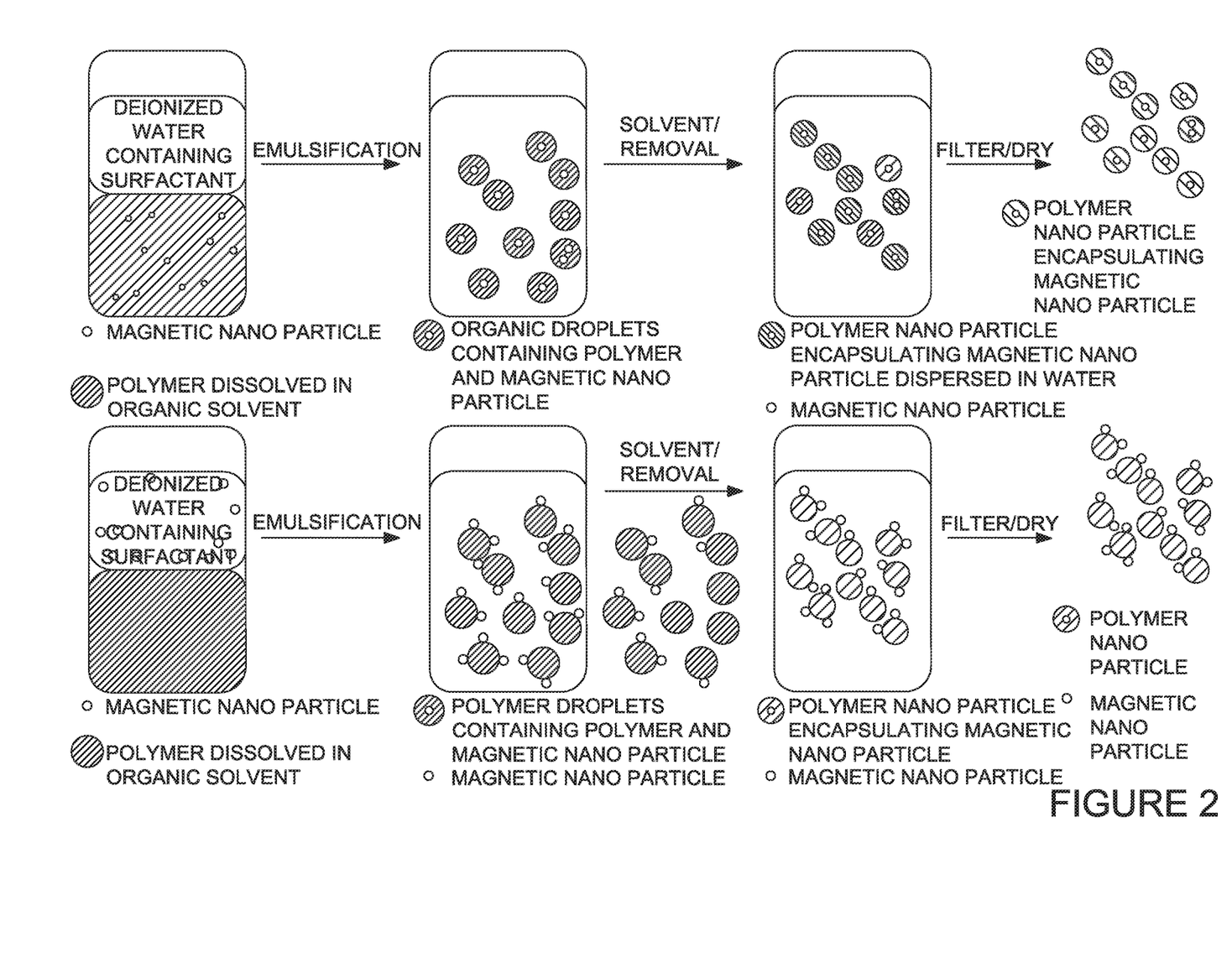
FIG. 2 is a schematic representation of the emulsification process for forming microparticles, according to various aspects.

In one aspect, a method of making a particle having a plurality of inorganic or organic nanoparticles embedded in at least one microparticle is provided. The plurality of inorganic or organic nanoparticles can be a plurality of magnetic inorganic nanoparticles or a plurality of magnetic organic nanoparticles, or a combination thereof. The method includes contacting an aqueous composition including at least one surfactant with a solution of the at least one polymeric material, from which the microparticles are formed (e.g., one or more of the thermoplastic resins described herein is dissolved in an organic solvent), dissolved in an organic solvent and emulsifying the aqueous composition and the solution to form a dispersion of organic droplets including the at least one polymeric material and the nanoparticles. The nanoparticles can be dispersed in the aqueous composition or in the organic solvent. FIG. 2 depicts a schematic representation of the synthesis of the particles according to the inventive methods described herein.

In various aspects, the aqueous composition includes deionized water and at least one surfactant. In various aspects, the surfactant includes an ionic or non-ionic surfactant. Suitable surfactants include L-a-phosphatidylcholine (PC), 1,2-dipalmitoylphosphatidycholine (DPPC), oleic acid, sorbitan trioleate, sorbitan mono-oleate, sorbitan monolaurate, polyoxyethylene sorbitan monolaurate, sodium dodecyl benzene sulfonate, sodium dodecyl sulfate, ammonium lauryl sulfate, sodium lauryl ether sulfate (SLES), sodium myreth sulfate, dioctyl sodium sulfosuccinate, perfluorooctanesulfonate (PFOS), perfluorobutanesulfonate, and linear alkylbenzene sulfonates (LABS), polyoxyethylene sorbitan monooleate, natural lecithin, oleyl polyoxyethylene ether, stearyl polyoxyethylene ether, lauryl polyoxyethylene ether, block copolymers of oxyethylene and oxypropylene, synthetic lecithin, diethylene glycol dioleate, tetrahydrofurfuryl oleate, ethyl oleate, isopropyl myristate, glyceryl monooleate, glyceryl monostearate, glyceryl monoricinoleate, cetyl alcohol, stearyl alcohol, polyethylene glycol 400, cetyl pyridinium chloride, benzalkonium chloride, olive oil, glyceryl monolaurate, corn oil, cotton seed oil, and sunflower seed oil, and combinations and derivatives thereof.

The nonionic surfactant can be a $C_{8-22}$ aliphatic alcohol ethoxylate having about 1 to about 25 mol of ethylene oxide and having have a narrow homolog distribution of the ethylene oxide ("narrow range ethoxylates") or a broad homolog distribution of the ethylene oxide ("broad range ethoxylates"). The nonionic surfactant can be a $C_{10-20}$ aliphatic alcohol ethoxylate having about 2 to about 18 mol of ethylene oxide. Examples of suitable commercially available nonionic surfactants of this type include Tergitol™ 15-S-9 (a condensation product of $C_{11-15}$ linear secondary alcohol with 9 moles ethylene oxide), Tergitol™ 24-L-NMW (a condensation product of $C_{12-14}$ linear primary alcohol with 6 moles of ethylene oxide) with a narrow molecular weight distribution from Dow Chemical Company. Additional suitable nonionic surfactants include the Genapol™ brands of Clariant GmbH. Other nonionic surfactants that can be used include polyethylene, polypropylene, and polybutylene oxide condensates of $C_{6-12}$ alkyl phenols, for example compounds having 4 to 25 moles of ethylene oxide per mole of $C_{6-12}$ alkylphenol. In various aspects, the nonionic surfactant includes 5 to 18 moles of ethylene oxide per mole of a $C_{6-12}$ alkylphenol. Commercially available surfactants of this type include Igepal® CO-630, Triton® X-45, X-114, X-100 and X102, Tergitol™ TMN-10, Tergitol® TMN-100X, and Tergitol™ TMN-6 (all polyethoxylated 2,6,8-trimethyl-nonylphenols or mixtures thereof) from Dow Chemical Corporation, and the Arkopal-N products from Hoechst AG. Other suitable surfactants can include the addition products of ethylene oxide with a hydrophobic base formed by the condensation of propylene oxide with propylene glycol. The hydrophobic portion of these addition products can have, in various aspects, a molecular weight between about 1500 and about 1800 Daltons. Commercially available examples of this class of product are the Pluronic brands from BASF and the Genapol PF trademarks of Hoechst AG. The addition product of ethylene oxide with a reaction product of propylene oxide and ethylenediamine can also be used. The hydrophobic moiety of these compounds consists of the reaction product of ethylenediamine and excess propylene oxide, and generally has a molecular weight of about 2500 to about 3000 Daltons. This hydrophobic moiety of ethylene oxide is added until the product contains from about 40% to about 80% w/w of polyoxyethylene and has a molecular weight of about 5000 to about 11,000 Daltons. Commercially available examples of this compound class are the Tetronic® brands from BASF and the Genapol PN trademarks of Hoechst AG. In various aspects, the nonionic surfactant is a $C_{6-12}$ alkyl phenol having 4 to 25 moles of ethylene oxide per mole of $C_{6-12}$ alkylphenol. In various aspects, the nonionic surfactant is a $C_{6-12}$ alkyl phenol having 5 to 18 moles of ethylene oxide per mole of $C_{6-12}$ alkylphenol. In various aspects, an ionic surfactant (e.g., an anionic surfactant) can be included in combination with the nonionic surfactant. For example, when present, an anionic surfactant can be in an amount of 0.1 to 10% w/w, relative to the weight of the nonionic surfactant. The anionic surfactant can be present in amount of 1 to 9% w/w, 2 to 8% w/w, 3 to 7% w/w, or 4 to 6% w/w. The anionic surfactant can be present in amount of 0.1% w/w, 0.5% w/w, 1% w/w, 3% w/w, 4% w/w, 5% w/w, 6% w/w, 7% w/w, 8% w/w, 9% w/w, or 10% w/w, or any range between these values.

The organic solvent can be any solvent that is capable of dissolving a thermoplastic resin or thermoplastic resin mixture, such as the polyetherimide resin described herein. The organic solvent can also be a mixture of solvents. Suitable organic solvents include methylene chloride, chloroform, and dichloromethane. In some instances, the organic solvent should be substantially immiscible with water and have a boiling point of less than about 100° C.

The polymer microparticles can be made via emulsification followed by a solvent removal process. Emulsification followed by an organic solvent removal process generates polymer particles in water, which can also be referred to as a slurry. The slurry can be further filtered or spray dried to obtain the wet or dry polymer materials. To remove larger particles from the slurry (e.g., with particle diameters above 75 μm), settling followed by decantation can be used.

In the emulsification process, the polymer dissolved in organic solvent can be mixed with deionized water containing a surfactant followed by emulsification, which results in emulsion formation. Solvent removal from the above formed emulsion results in polymer microparticles that contain embedded magnetic nanoparticles.

In various aspects, the nanoparticles are dispersed in the aqueous composition prior to mixing with the organic solvent. Combining nanoparticles dispersed in an aqueous composition and an organic solvent containing dissolved polymeric material results in an emulsion containing droplets of polymeric material that have nanoparticles disposed on the surface of the droplets, as shown in FIG. 2. In various aspects, the nanoparticles are dispersed in the organic solvent, prior to mixing with the aqueous composition. Combining nanoparticles dispersed in an organic solvent containing dissolved polymeric material with an aqueous composition results in an emulsion containing droplets of polymeric material that encapsulate the nanoparticles, as shown in FIG. 2. After the aqueous and organic portions described herein are combined, a high shear mixer can be used to form the stable emulsion.

In various aspects, the method further includes removing the organic solvent to form an aqueous dispersion of polymer particles that includes the nanoparticles embedded in the polymeric microparticles. Organic solvent can be removed by, for example, heating the emulsion containing droplets of polymeric material and the associated nanoparticles to remove the organic solvent, which has a lower boiling point than water. The heating can also be performed at a reduced pressure that is less than atmospheric pressure. After the organic solvent is removed, the aqueous phase contains a slurry of microparticles of polymeric material with nanoparticles embedded in microparticles, disposed on the surface of the microparticles, or both disposed on the surface and embedded in the interior of the microparticles. The particles can be filtered using, for example, a 2 micron filter, to isolate the particles and remove the water. The filtered particles can be optionally washed with deionized water. The particles can be dried at 100 degrees Celsius (° C.) to about 200° C. under vacuum to remove water.

In various aspects, a composition containing nanoparticles embedded in polymeric microparticles can also include a flow agent. The flow agent can be present in amount of 0%, 0.01% to 5%, 0.05% to 1%, or 0.1% to 0.25% by weight of a particulate flow agent. In various aspects, a composition containing nanoparticles embedded in polymeric microparticles contains 0.1% to 0.25%, by weight, of the flow agent. This flow agent is a particulate inorganic material having a median particle size of 10 microns or less, and can include hydrated silica, amorphous alumina, a glassy silica, a glassy phosphate, a glassy borate, a glassy oxide, titania, talc, mica, a fumed silica, kaolin, attapulgite, calcium silicate, alumina, and magnesium silicate, and combinations thereof. In one aspect, the flow agent is a fumed silica. In various aspects, a filler can be added to the particles before formation of the emulsion or any time after the formation of the emulsion. In various aspects, the filler can include single walled carbon nanotubes or multi walled carbon nanotubes. In various aspects, a particle that responds to a magnetic field includes from about 0.01% to about 25% w/w of an iron oxide nanoparticle embedded in a polyetherimide microparticle is provided. The microparticle has an average size of from about 1 μm to about 75 μm.

In various aspects, a method of making a composite material includes combining a plurality of microparticles containing magnetic nanoparticles with a non-magnetic material. The non-magnetic material can be an inorganic building block material. Examples of suitable inorganic building block materials include stone, cement, ceramic, minerals, and glass, and combinations thereof. The building block materials can be in the form of a powder containing particles with regular or irregular shapes, and the particles of the building block material in the powder can have any suitable size, for example from about 0.01 microns to about 1000 microns as measured by the largest dimension of the particle of the building block material. The plurality of microparticles containing magnetic nanoparticles can be present in any suitable amount relative to the amount of the building block material, for example the microparticles can be present from about 0.01% w/w to about 20% w/w relative to the amount of the building block material.

Figure 3:
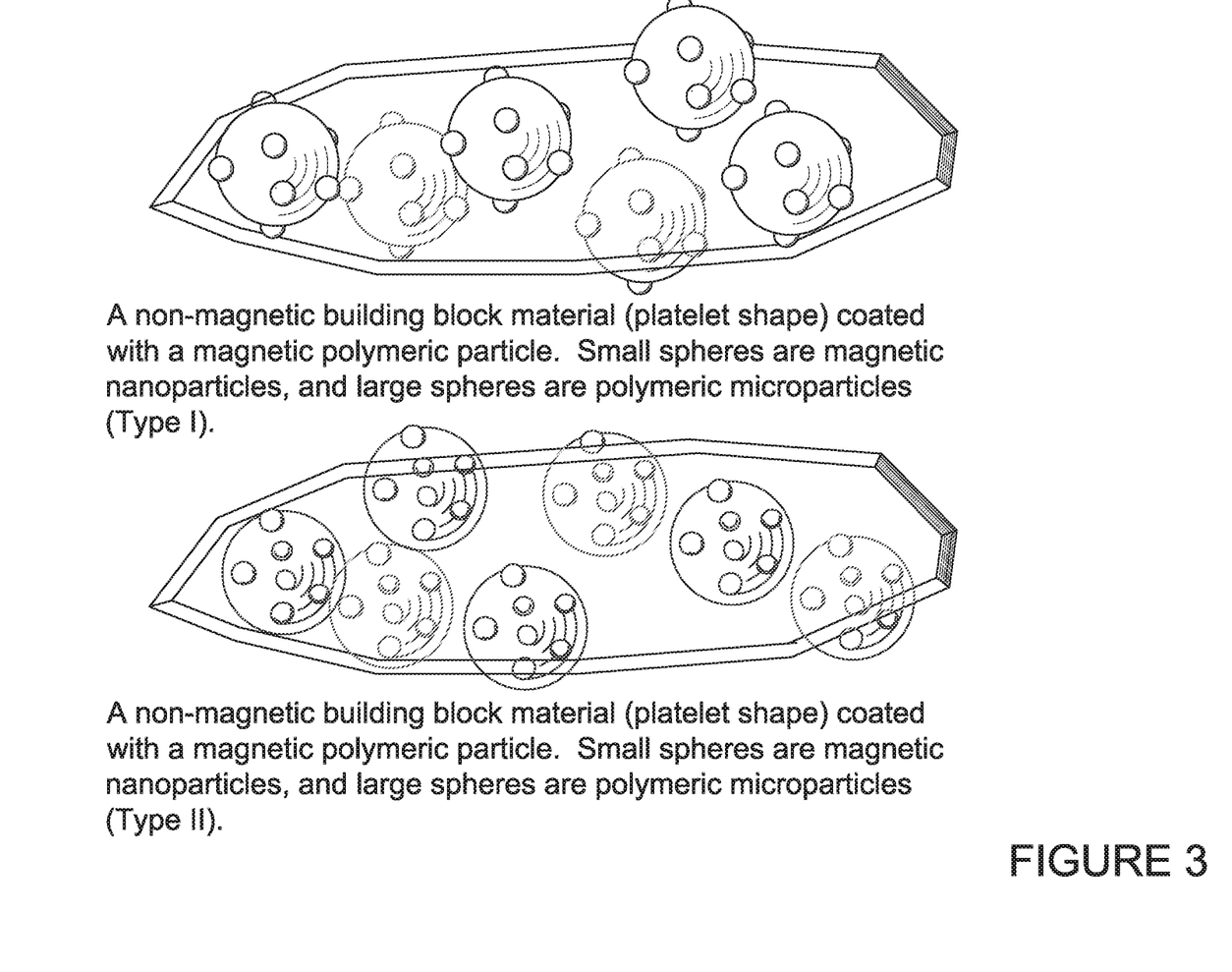
FIG. 3 is a cartoon representation of a non-magnetic building block material coated with a magnetic polymeric particle, according to various aspects.
Figure 4:
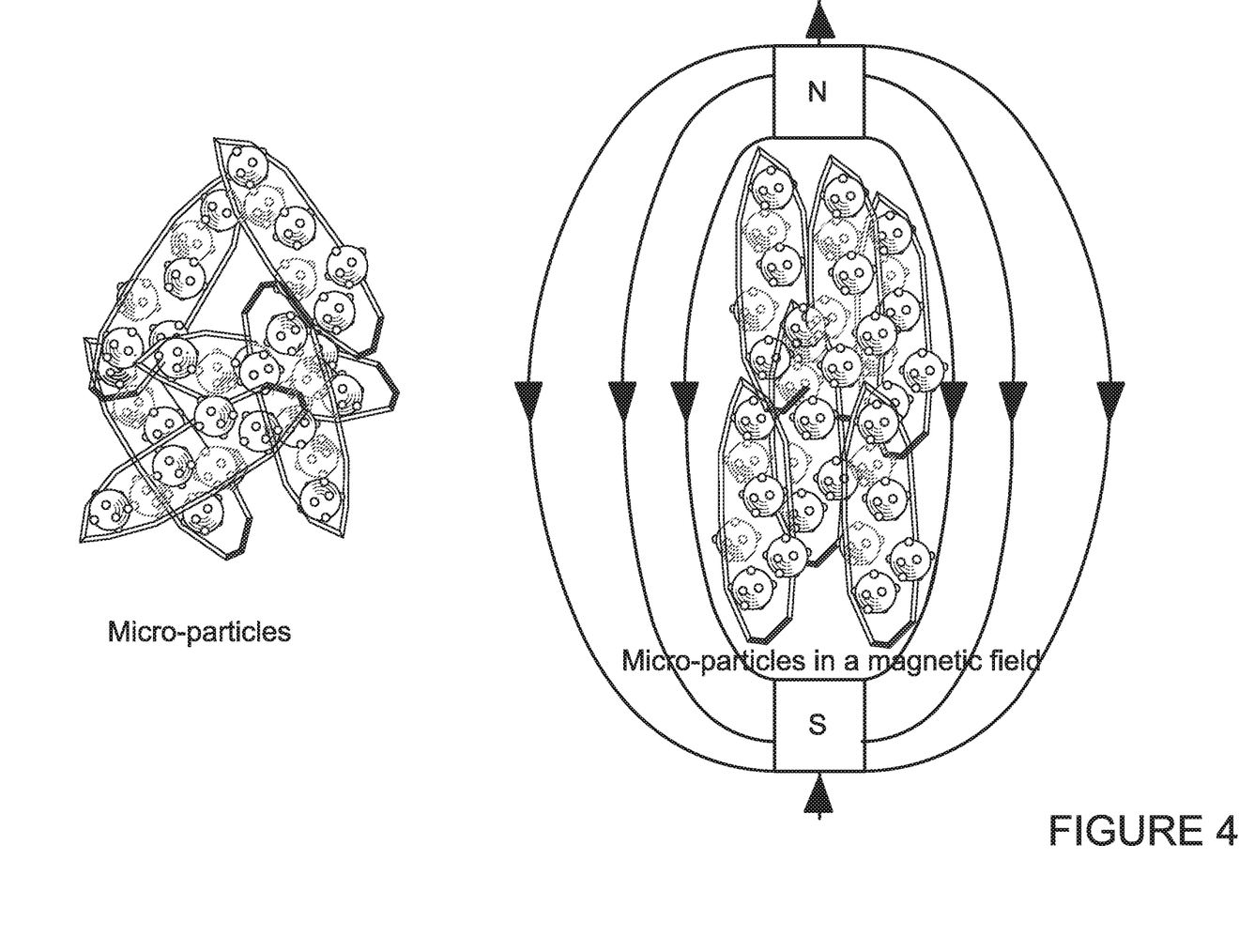
FIG. 4 is a cartoon of a particle comprising an iron oxide nanoparticle in a polymeric microparticle that is bonded to a non-magnetic building block material that is aligned using a magnetic field, according to various aspects.

In various aspects, a plurality of microparticles containing magnetic nanoparticles can be chemically bonded or mechanically bound to the non-magnetic material. In various aspects, the composite material is orientable in a magnetic field. Inorganic building block materials have an aspect ratio, so that they are larger in one dimension than in another. For example, a non-magnetic building block can include platelet-like building blocks that are longer than they are wide, as shown in FIG. 3. The magnetic particles described herein, when bonded or attached to the non-magnetic building block materials can then be used to orient the non-magnetic building block materials in a magnetic field. The magnetic field lines of a magnet exert an attractive magnetic force on the magnetic particles, and, because these magnetic particles are attached to the building block material, it causes the alignment of the building block material as well, as shown in FIG. 4. Once a desired quantity of building block material is oriented in this manner, compression molding can be used to compress the building block material into a desired shape. This shape will have anisotropic internal structures due to the magnetic alignment of the building block materials.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" or "at least one of A or B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. A comma can be used as a delimiter or digit group separator to the left or right of a decimal mark; for example, "0.000,1" is equivalent to "0.0001."

In the methods described herein, the acts can be carried out in any order without departing from the principles of the disclosure, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about," as used herein can allow for a degree of variability in a value or range, for example, within 10%, within 5%, or within 1% of a stated value or of a stated limit of a range, and includes the exact stated value or range.

The term "substantially," as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

The term "solvent" as used herein refers to a liquid that can dissolve a solid, liquid, or gas. Non-limiting examples of solvents are silicones, organic compounds, water, alcohols, ionic liquids, and supercritical fluids.

The term "surface," as used herein, refers to a boundary or side of an object, wherein the boundary or side can have any perimeter shape and can have any three-dimensional shape, including flat, curved, or angular, wherein the boundary or side can be continuous or discontinuous.

As used herein, the term "polymer" refers to a molecule having at least one repeating unit and can include copolymers, oligomers, and macromonomers.

As used herein, the term "embedded" refers to a substance that is partially or substantially inside another substance. For example, a nanoparticle can be embedded in a microparticle and still have a portion of the nanoparticle's surface outside the interior of the microparticle. The nanoparticle can also be embedded inside the interior of a microparticle such that no portion of the nanoparticle is outside the interior of the microparticle.

The term "completely embedded" refers to a substance that is entirely inside of another substance. For example, a nanoparticle that is completely embedded in a microparticle has the entire nanoparticle structure in the interior of the microparticle.

As used herein, the term "organic" refers to a substance that contains at least one carbon-hydrogen bond, and includes polymers, copolymers, and monomers as non-limiting examples.

As used herein, the term "inorganic" refers to a substance that lacks carbon-hydrogen bonds, and includes and includes metals, metal oxides, silica, gold, silver, and quantum dots.

As used herein, the term "respond to a magnetic field" refers to a substance that is attracted to a magnetic field generated by a magnetic field source, such as a permanent magnet or an electromagnet, and is capable of moving or flowing when the magnetic field moves.

EXAMPLES

Various aspects of the present disclosure can be better understood by reference to the following Examples which are offered by way of illustration. The present aspects are not limited to the Examples given herein.

Preparation of Nanoparticle and Polymer Droplet Aqueous Dispersion 47.5 grams of Ultem™ 1010 resin was dissolved in 200 grams of methylene chloride. To this polymer solution, 2.5 grams of $Fe_3O_4$ magnetic nanoparticles were added and sonicated for ten minutes. After sonication, 20 grams, of de-ionized (hereinafter "DI") water containing 0.18 grams of sodium dodecyl benzene sulfonate (SDBS) surfactant (9000 ppm of SDBS based on DI water weight) was added, and the resulting aqueous composition was added to the polymer solution. The resulting two phases were emulsified using a shaker table at a low setting for 10 minutes, after which a stable emulsion formed.

Removal of Organic Solvent

The above prepared emulsion was transferred dropwise into a glass vessel containing 200 grams of DI water and 0.4 grams of SDBS, which was maintained at about 80° C., and agitated using a magnetic stirrer. The methylene chloride was condensed using a cold-water circulated condenser. Once substantially all of the methylene chloride was removed, the aqueous slurry was filtered through a 75-micron sieve to remove any particles with sizes above 75 microns. The aqueous slurry was then filtered using a 2-micron filter paper to remove the water, washed thrice with DI water, and dried overnight at about 160° C. under vacuum.

Figure 5:
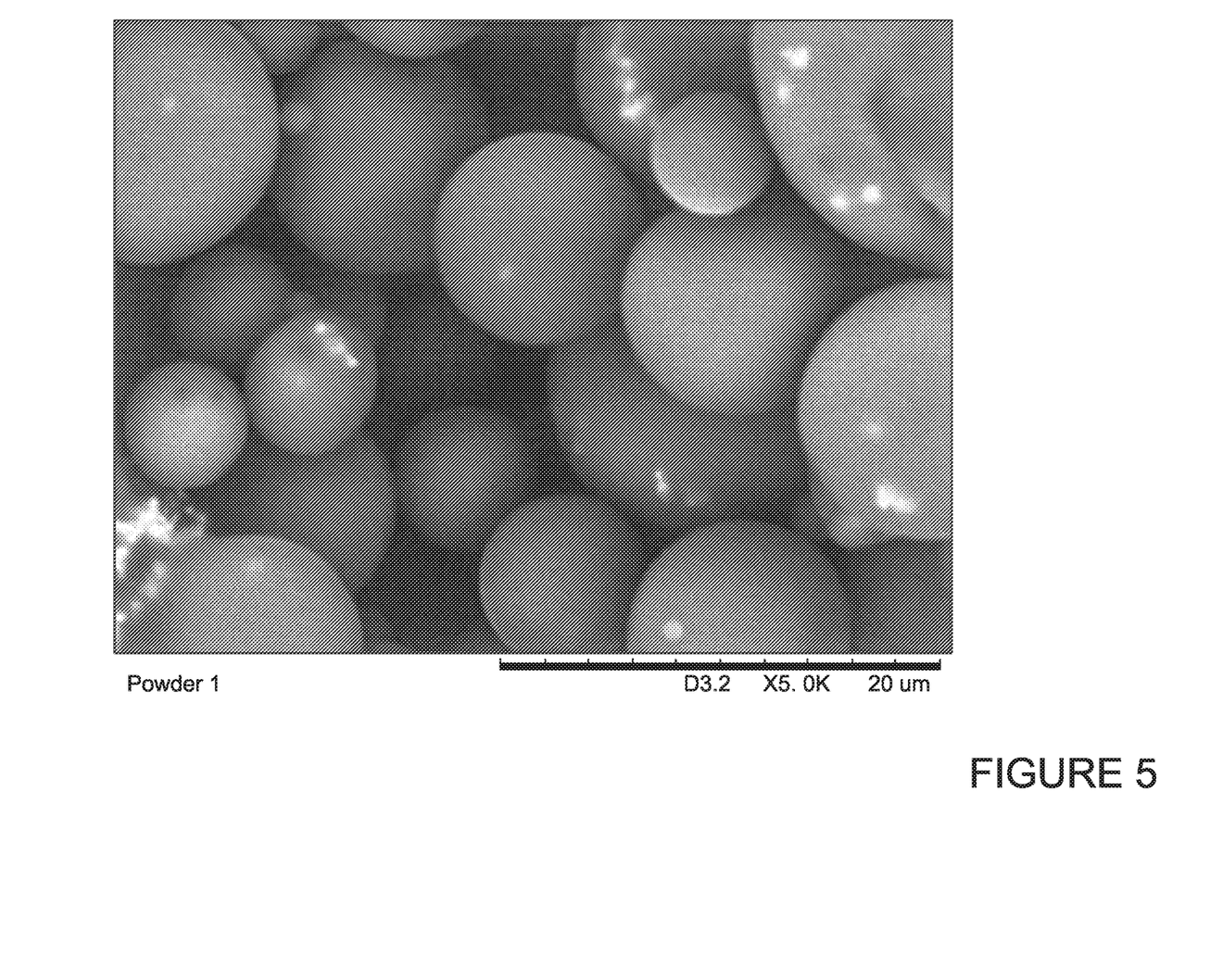
FIG. 5 is a scanning electron micrograph of iron oxide ($Fe_3O_4$) nanoparticles embedded in Ultem® polymer microparticles.
Figure 6A:
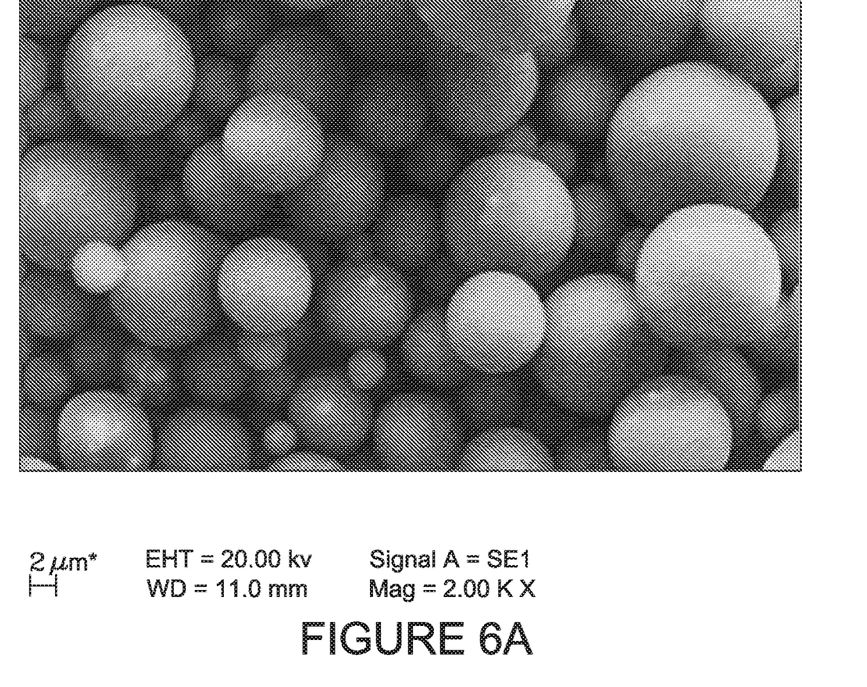
FIG. 6A is a scanning electron micrograph of iron oxide ($Fe_3O_4$) nanoparticles embedded in Ultem® polymer microparticles, according to various aspects.
Figure 6B:
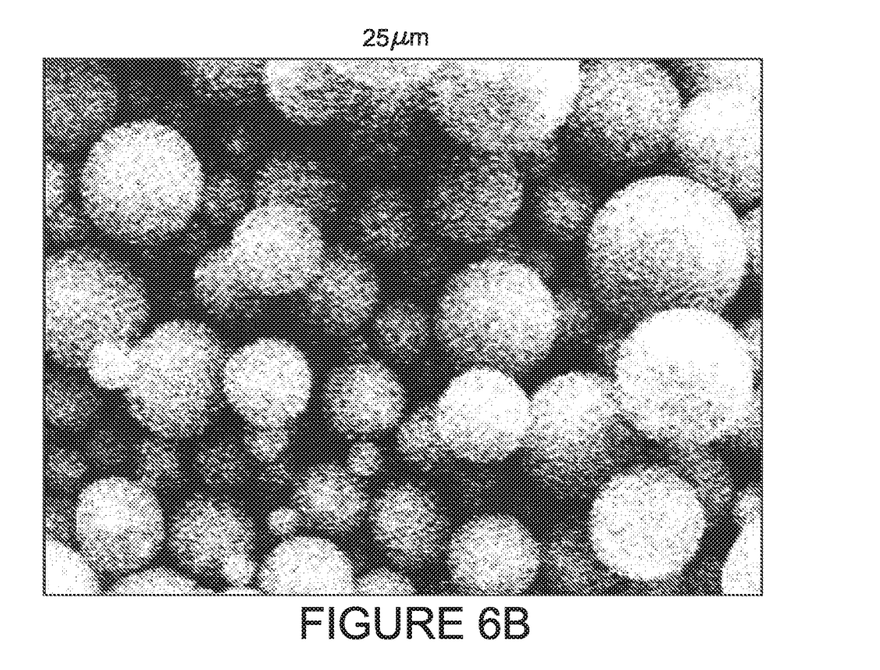
FIG. 6B is an area selected for EDX elemental map and elemental analysis, according to various aspects.

FIG. 5 and FIG. 6A show scanning electron micrographs of particles prepared by the methods described herein. In FIG. 5, the microparticles have a $T_g$ of 217° C., a Mw of 45291 grams per mole (g/mol), a number molecular weight $M_n$ of 20000 g/mol, a $D_v50$ of 9.9 µm, and a $D_n50$ of 7.0 µm. FIG. 6B shows an area selected for EDX (energy-dispersive x-ray) elemental map and elemental analysis of particles prepared by the methods described herein.

Figure 7A:
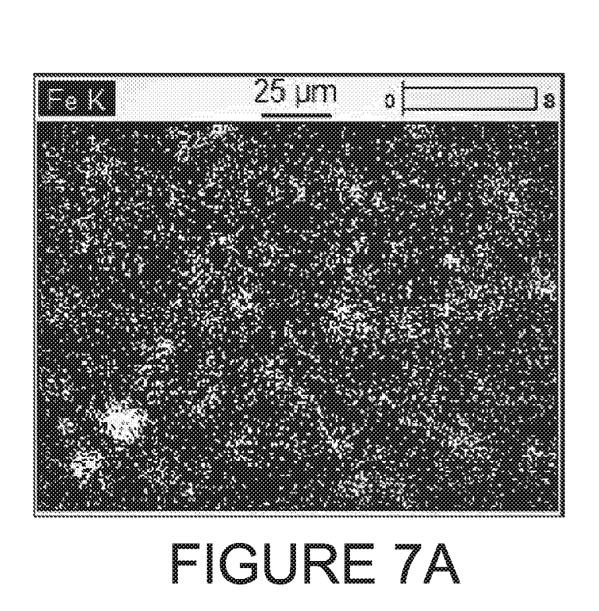
FIG. 7A shows an EDX elemental map of Fe in a sample of $Fe_3O_4$ nanoparticles embedded in polymeric microparticles, according to various aspects.
Figure 7B:
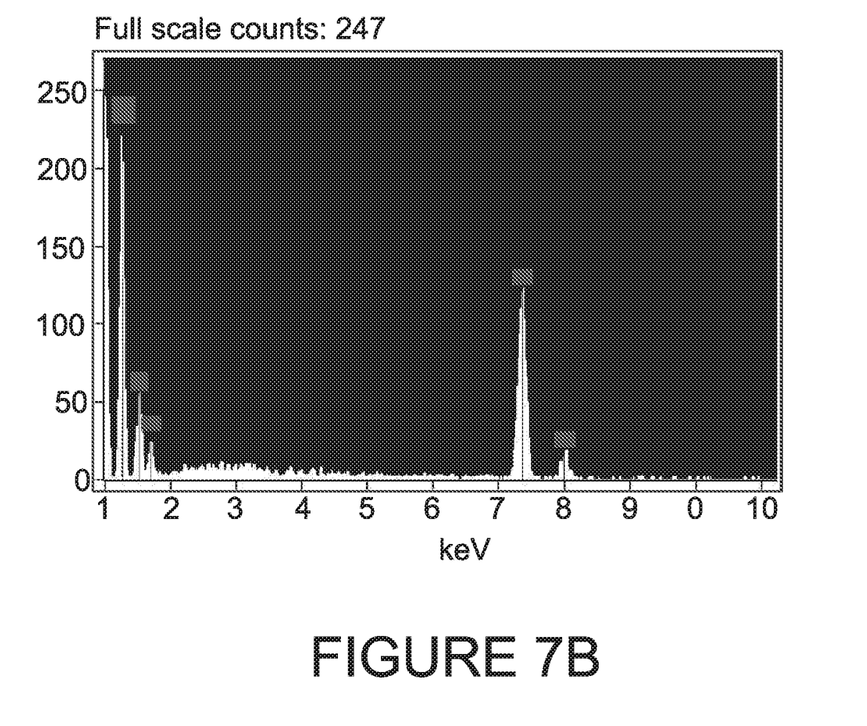
FIG. 7B is a map of the EDX results for the particles shown in FIGS. 6A and 6B.

FIG. 7A is an EDX elemental map of Fe in a sample of $Fe_3O_4$ nanoparticles embedded in polymeric microparticles, while FIG. 7B is a map of EDX results for the particles shown in FIGS. 6A and 6B.

The terms and expressions that have been employed are used as terms of description and not of limitation, and there is no intention in the use of such terms and expressions of excluding any equivalents of the features shown and described or portions thereof, but it is recognized that various modifications are possible within the scope of the aspects of the present disclosure. Thus, it should be understood that although the present disclosure has been specifically disclosed by specific aspects and optional features, modification and variation of the concepts herein disclosed may be resorted to by those of ordinary skill in the art, and that such modifications and variations are considered to be within the scope of aspects of the present disclosure.

ASPECTS

The following exemplary aspects are provided, the numbering of which is not to be construed as designating levels of importance:

Aspect 1 provides a particle comprising, consisting of, or consisting essentially of a plurality of magnetic inorganic or organic nanoparticles embedded in at least one microparticle, the microparticle comprising at least one polymeric material.

Aspect 2 provides the particle of aspect 1, wherein the nanoparticles comprise metal oxide nanoparticles.

Aspect 3 provides the particle of any one of 1-2, wherein the metal oxide is $Al_2O_3$, NiO, $Fe_2O_3$, $Fe_3O_4$, $ZrO_2$, $MoO_3$, $CeO_2$, $Y_2O_3$, $TiO_2$, MgO, ZnO, $ZrO_2$, SnO, or combinations thereof.

Aspect 4 provides the particle of any one of aspects 1-3, wherein the nanoparticles respond to a magnetic field.

Aspect 5 provides the particle of any one of aspects 1-4, wherein the nanoparticles comprise from about 0.01% to about 25% w/w of the microparticle.

Aspect 6 provides the particle of any one of aspects 1-5, wherein the nanoparticles comprise particles having an average size of from about 10 nm to about 5000 nm.

Aspect 7 provides the particle of any one of aspects 1-6, wherein the microparticle comprises a thermoplastic resin.

Aspect 8 provides the particle of any one of aspects 1-7, wherein the thermoplastic resin comprises a polyetherimide, polycarbonate, polyether ether ketone, polyethersulfone, or combinations thereof.

Aspect 9 provides the particle of any one of aspects 1-8, wherein the average size of the particle is from about 0.25 µm to about 75 µm.

Aspect 10 provides the particle of any one of aspects 1-9, wherein the nanoparticles are homogenously distributed throughout the microparticle.

Aspect 11 provides the particle of any one of aspects 1-10, wherein the nanoparticles are substantially embedded in the microparticle.

Aspect 12 provides the particle of any one of aspects 1-11, wherein the nanoparticles are at least partially disposed on the surface of the microparticle.

Aspect 13 provides the particle of any one of aspects 1-12, wherein the nanoparticles cover from about 0.1% to about 50% of the surface area of the microparticle.

Aspect 14 provides a method of making the particle of aspects 1-13, comprising, consisting of, or consisting essentially of: contacting an aqueous composition comprising at least one surfactant with a solution of the at least one polymeric material dissolved in an organic solvent; and emulsifying the aqueous composition and the solution to form a dispersion of organic droplets comprising the least one polymeric material and the nanoparticles; wherein the nanoparticles are dispersed in the aqueous composition or in the organic solvent.

Aspect 15 provides the method of any one of aspects 14, wherein the aqueous composition comprises deionized water.

Aspect 16 provides the method of any one of aspects 14-15, wherein the at least one surfactant comprises an ionic or non-ionic surfactant.

Aspect 17 provides the method of any one of aspects 14-16, wherein the nanoparticles are dispersed in the aqueous composition.

Aspect 18 provides the method of any one of aspects 14-17, wherein the nanoparticles are dispersed in the organic solvent.

Aspect 19 provides the method of any one of aspects 14-18, further comprising: removing the organic solvent to form an aqueous dispersion of polymer particles comprising the least one polymeric material and the nanoparticles.

Aspect 20 provides a particle comprising: from about 0.01% to about 25% w/w of an iron oxide nanoparticle that responds to a magnetic field embedded in a polyetherimide microparticle, wherein the nanoparticle has an average size of from about 10 nm to about 5000 nm.

Aspect 21 provides a method of making a composite material, comprising: combining at least one particle of aspects 1-13 with a non-magnetic material.

Aspect 22 provides the method of any one of aspects 21, wherein the non-magnetic material is an inorganic building block material.

Aspect 23 provides the method of any one of aspects 21-22, wherein the at least one particle is chemically bonded to the non-magnetic material.

Aspect 24 provides the method of any one of aspects 21-23, wherein the at least one particle is mechanically bound to the non-magnetic material.

Aspect 25 provides the method of any one of aspects 21-24, wherein the composite material is orientable in a magnetic field.

What is claimed is:

1. A particle (P) comprising:
    a plurality of magnetic inorganic or organic particles (P1) embedded in at least one microparticle (P2), the microparticle (P2) comprising at least one polymeric material, wherein
    the magnetic inorganic or organic particles (P1) have an average size of from about 10 nm to about 5000 nm,
    the polymeric material comprises a thermoplastic resin comprising a polyetherimide, polycarbonate, polyether ether ketone, polyethersulfone, or combinations thereof, and
    the average size of the particle (P) is from about 0.25 μm to about 75 μm.

2. The particle (P) of claim 1, wherein the magnetic inorganic or organic particles (P1) comprise a metal oxide.

3. The particle (P) of claim 2, wherein the metal oxide is $NiO$, $Fe_2O_3$, $Fe_3O_4$, $MoO_3$, $CeO_2$, $Y_2O_3$, $TiO_2$, or combinations thereof.

4. The particle (P) of claim 1, wherein the magnetic inorganic or organic particles (P1) respond to a magnetic field.

5. The particle (P) of claim 1, wherein the magnetic inorganic or organic particles (P1) comprise from about 0.01% to about 25% w/w of the microparticle (P2).

6. The particle (P) of claim 1, wherein the magnetic inorganic or organic particles (P1) have an average size of from about 10 nm to about 1000 nm.

7. The particle (P) of claim 2, further comprising additional metal oxides selected from the group consisting of $Al_2O_3$, $ZrO_2$, $MgO$, $ZnO$, and combinations thereof.

8. The particle (P) of claim 1, wherein the average size of the particle (P) is from about 1 μm to about 75 μm.

9. The particle (P) of claim 1, wherein the magnetic inorganic or organic particles (P1) are homogenously distributed throughout the microparticle (P2).

10. The particle (P) of claim 1, wherein the magnetic inorganic or organic particles (P1) are substantially embedded in the microparticle (P2).

11. The particle (P) of claim 1, wherein the magnetic inorganic or organic particles (P1) are at least partially disposed on the surface of the microparticle (P2).

12. The particle (P) of claim 11, wherein the magnetic inorganic or organic particles (P1) cover from about 0.1% to about 50% of the surface area of the microparticle (P2).

13. A method of making the particle (P) of claim 1, comprising:
    contacting an aqueous composition comprising at least one surfactant with a solution of the at least one polymeric material dissolved in an organic solvent; and
    emulsifying the aqueous composition and the solution to form a dispersion of organic droplets comprising the least one polymeric material and the magnetic inorganic or organic particles (P1);
    wherein the magnetic inorganic or organic particles (P1) are dispersed in the aqueous composition or in the organic solvent.

14. The method of claim 13, wherein the aqueous composition comprises deionized water.

15. The method of claim 13, wherein the at least one surfactant comprises an ionic or non-ionic surfactant.

16. The method of claim 13, wherein the magnetic inorganic or organic particles (P1) are dispersed in the aqueous composition.

17. The method of claim 13, wherein the magnetic inorganic or organic particles (P1) are dispersed in the organic solvent.

18. The method of claim 13, further comprising:
    removing the organic solvent to form an aqueous dispersion of polymer particles (P) comprising the least one polymeric material and the magnetic inorganic or organic particles (P1).

19. A particle (P) comprising:
    from about 0.01% to about 25% w/w of an iron oxide particle (P1) that responds to a magnetic field embedded in a polyetherimide microparticle (P2), wherein the iron oxide particle (P1) has an average size of from about 10 nm to about 5000 nm.

20. The particle (P) of claim 19, wherein the iron oxide particle (P1) has an average size of from about 10 nm to about 1000 nm.

* * * * *